No. 694,726. Patented Mar. 4, 1902.
M. BRUNER.
SHOCKING ATTACHMENT FOR WAGONS.
(Application filed Oct. 15, 1901.)
(No Model.) 4 Sheets—Sheet 1.
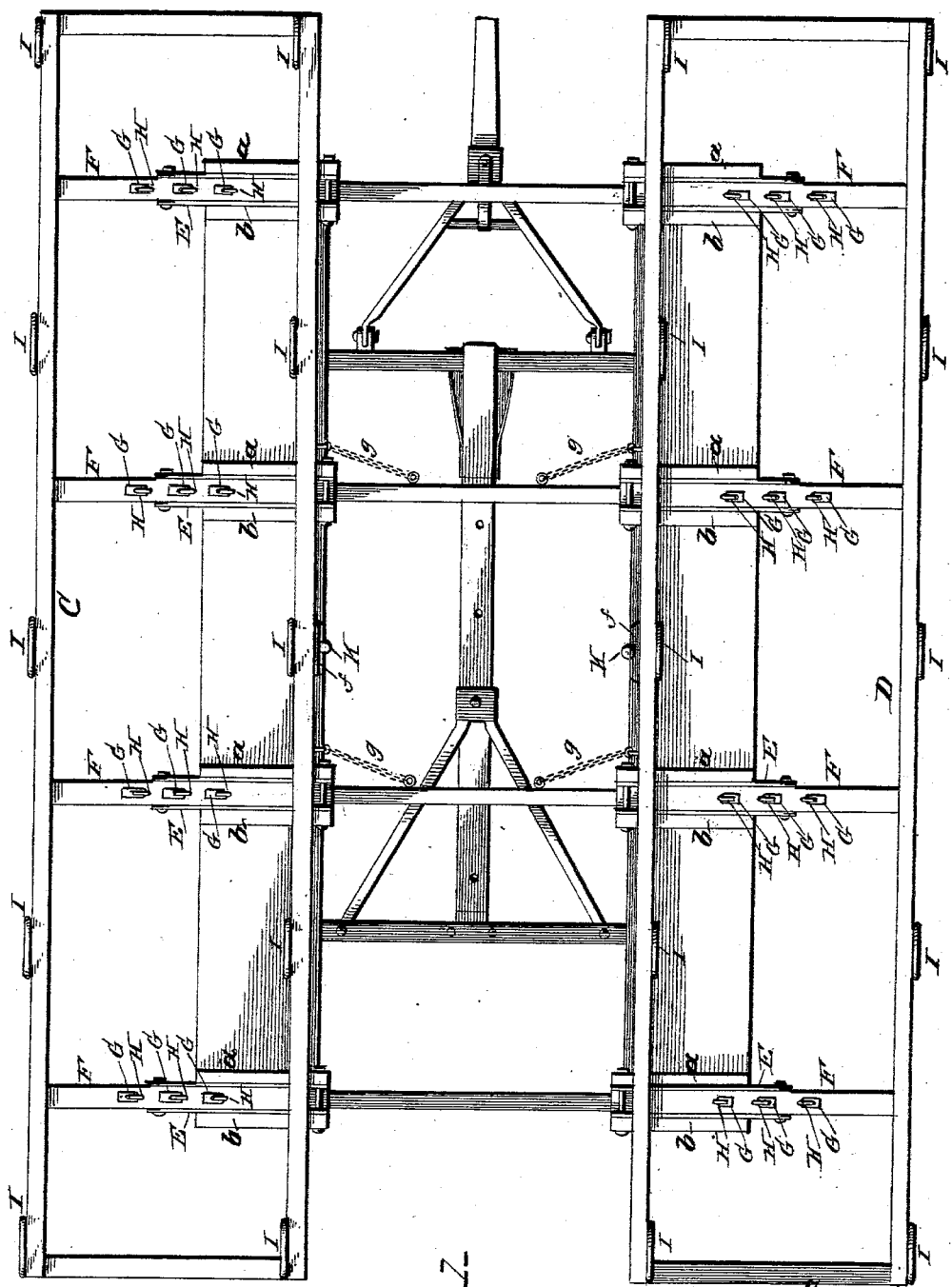
Witnesses
C. J. Williamson
Wm. C. Merriman
Inventor
Martin Bruner,
per Chas. H. Fowler
Attorney No. 694,726. Patented Mar. 4, 1902.
M. BRUNER.
SHOCKING ATTACHMENT FOR WAGONS.
(Application filed Oct. 15, 1901.)
(No Model.) 4 Sheets—Sheet 2.
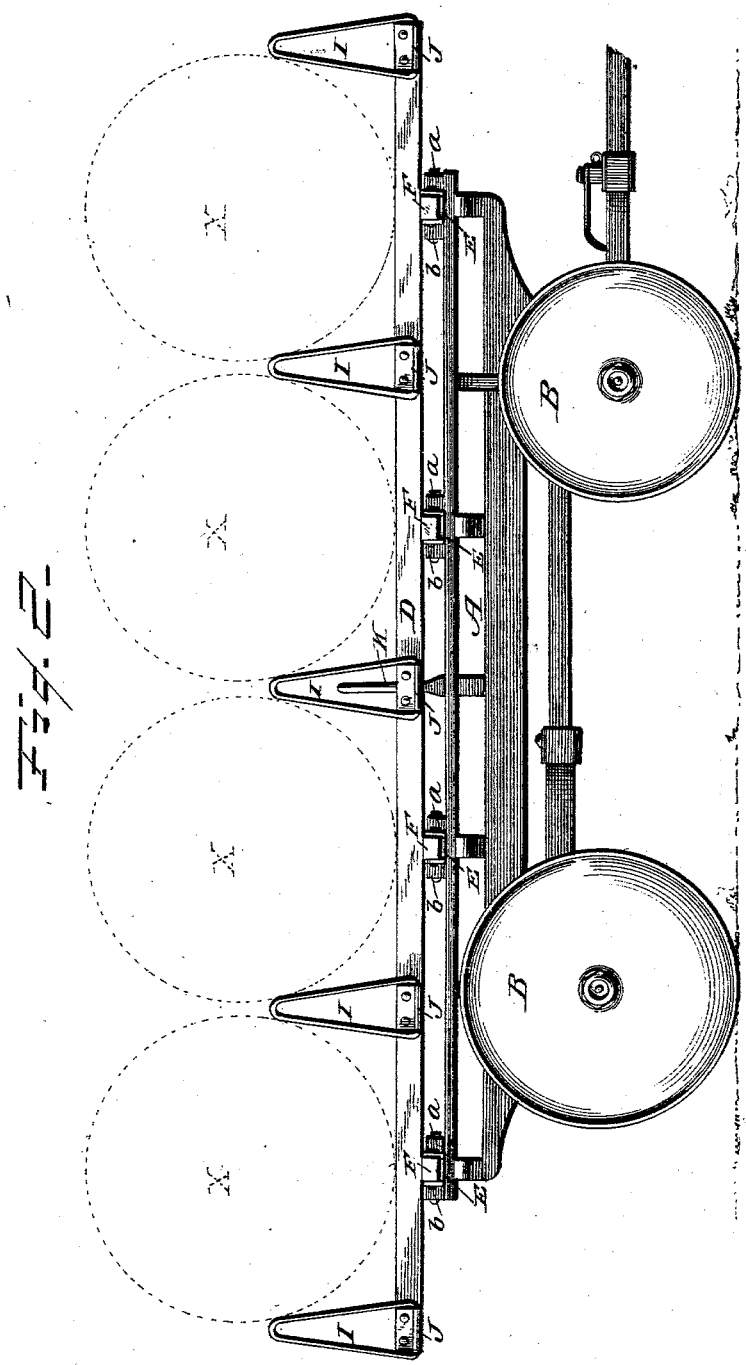
Witnesses
C. J. Williamson
Wm. C. Merriman
Inventor
Martin Bruner.
per Chas. H. Fowler
Attorney No. 694,726. Patented Mar. 4, 1902.
M. BRUNER.
SHOCKING ATTACHMENT FOR WAGONS.
(Application filed Oct. 15, 1901.)
(No Model.) 4 Sheets—Sheet 3.
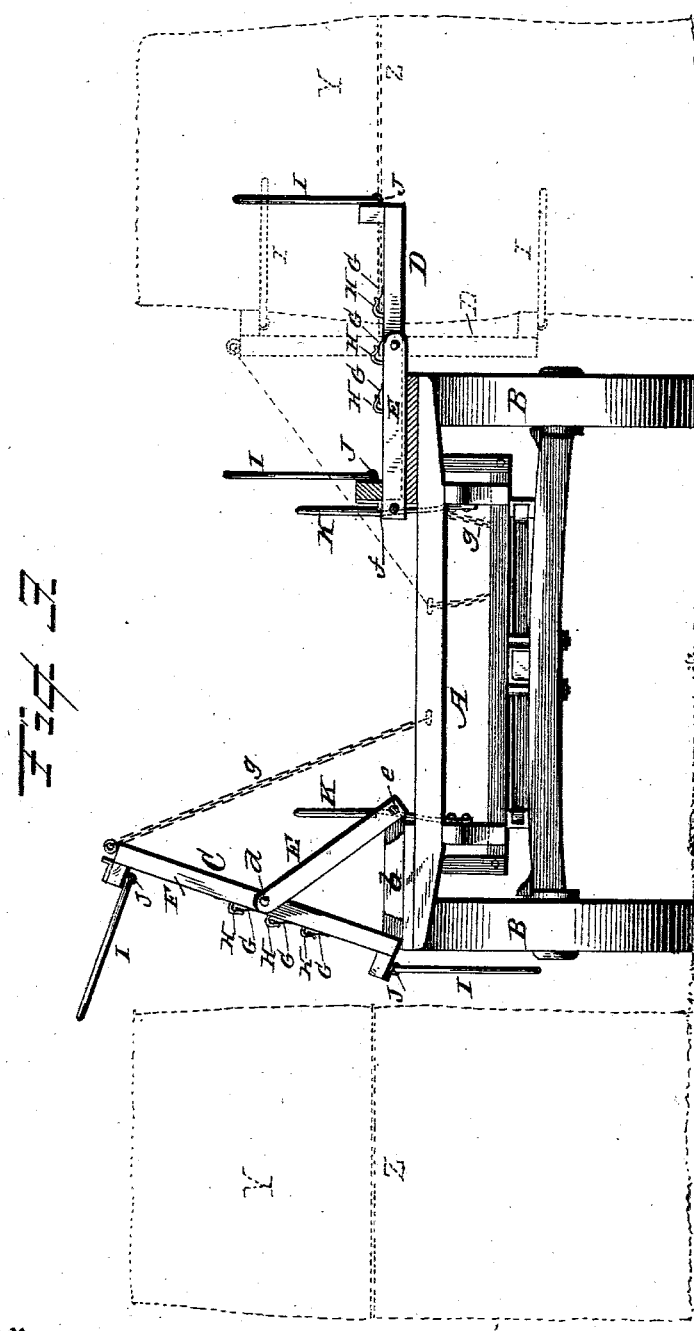
Witnesses
Inventor
Martin Bruner.
per Chas. H. Fowler
Attorney No. 694,726. Patented Mar. 4, 1902.
M. BRUNER.
SHOCKING ATTACHMENT FOR WAGONS.
(Application filed Oct. 15, 1901.)
(No Model.) 4 Sheets—Sheet 4.
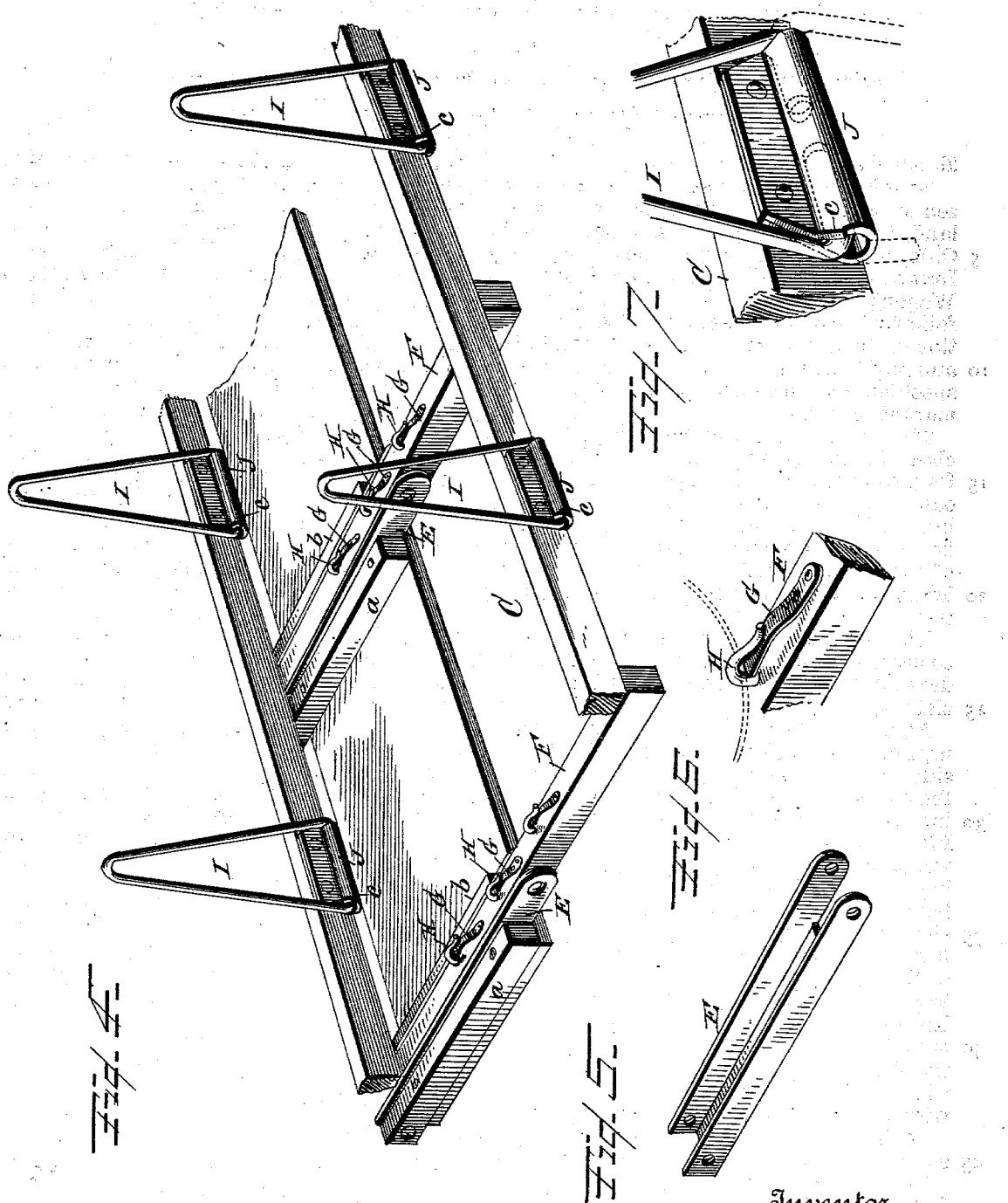
Witnesses
C. J. Williamson.
Wm. C. Merriman.
Inventor
Martin Bruner,
per Chas. H. Fowler
Attorney

UNITED STATES PATENT OFFICE.

MARTIN BRUNER, OF BUCKLAND, OHIO.

SHOCKING ATTACHMENT FOR WAGONS.

SPECIFICATION forming part of Letters Patent No. 694,726, dated March 4, 1902.

Application filed October 15, 1901. Serial No. 78,732. (No model.)

*To all whom it may concern:*

Be it known that I, MARTIN BRUNER, a citizen of the United States, residing at Buckland, in the county of Auglaize and State of Ohio, have invented certain new and useful Improvements in Shocking Attachments to Wagons; and I do hereby declare that the following is a full, clear, and exact description of the same, reference being had to the annexed drawings, making a part of this specification, and to the letters of reference marked thereon.

The present invention has relation to that class of attachments to farm or other wagons for the purpose of shocking cornstalks, wheat, oats, or any field product that requires shocking; and the purpose of the invention is to improve the attachment in the several details of construction whereby the shock is conveniently deposited on the ground after being tied.

The invention consists in an attachment constructed substantially as shown in the drawings and hereinafter described and claimed.

Figure 1 of the drawings is a top plan of my improved shocking attachment; Fig. 2, a side elevation thereof, showing the ends of the shocks in dotted lines, the attachment being shown as supported on a wagon-body; Fig. 3, an end view of the attachment and wagon-body shown in Fig. 2, the shocks being shown in dotted lines in position after being deposited upon the ground and the shocking-frames in an operating position; Fig. 4, a perspective view of a portion of one of the shocking-frames on an enlarged scale; Fig. 5, a similar view of one of the pivoted brackets to which the shocking-frame is pivoted; Fig. 6, a detail view in perspective showing the spring holding device for the wire tie; Fig. 7, a detail view of one of the wire standards and its connections.

In the accompanying drawings, A represents the usual wagon bed or rack, and B the wheels thereof, which may be of any preferred construction, as my improved shocking attachment is capable of use on any form of bed or support of a wagon.

The shocking attachment comprises a rectangular frame, and in practice it is proposed to use two of these frames, as indicated at C D of the drawings, one of said frames upon each side of the bed or support of the wagon, as shown in Fig. 1 of the drawings. The bed or support of the wagon is provided with parallel cleats $a$ $b$, which are arranged in pairs, and to and between each pair of cleats is pivoted a flanged link E, and to the outer end of the link is pivoted the shocking-frame, as shown more clearly in Fig. 3 of the drawings. These flanged links E form seats for the transverse bars F of the shocking-frames, which bars form braces for the frames to strengthen and reinforce them, so that they will support the weight of the shocks. To each transverse bar F is connected a plurality of wire-tie holders comprising a curved spring G and keeper H, as shown in detail in Fig. 6 of the drawings, the wire tie being shown in dotted lines. Any number of these wire-tie holders may be used, so as to adapt the shocking-frame to the various lengths of corn to be shocked, the wire tie being connected to any one of the series of holders as would be required to keep the tie at or near the center of the shock in tying the same. Pivotally connected to the inner and outer sides of the shocking-frames C D are wire standards I, which may be of any suitable construction, said standards being connected to a bracket J having cam-bearings $c$ against which the ends of the wire standard I abut when said standard is swung down as shown in Fig. 7 of the drawings and indicated in dotted lines. When the standard I is in an upright position it is held in such position by the spring action of the arms of said wire standard bearing against the ends of the bracket J. When the standard is to be swung down in the position shown in dotted lines of Fig. 7 of the drawings, the ends of the wire standard bearings against the cam-bearings $c$ will prevent the standards from dropping down by their own weight, the cam-bearings holding the standard in any position between the positions shown in full and dotted lines, the weight of the shock operating the wire standards.

It will be seen that the shocking-frame is a double-tilting frame by means of its double pivotal connection—that is to say, the frame is pivoted at $d$ to the outer ends of the links E and the links in turn are pivoted at their inner ends to and between the cleats *a b*, as shown at *e* in Fig. 3 of the drawings. The wire tie is first placed in position by slipping it over the spring G until it engages the keeper H, as shown in dotted lines in Fig. 6 of the drawings, the spring holding the tie in engagement with the keeper, but letting it slip out when the shock is tied and dumped or deposited on the ground. The shock is now placed upon the shocking-frame and over and upon the tying-wire and then properly tied, the end view of the tied shocks being indicated at X in the dotted lines of Fig. 2 of the drawings. After the shock is tied a suitable pivoted lever K, which normally engages a keeper-plate *f* to hold the shocking-frame in a horizontal position, is released, when the weight of the shocks upon the frame will automatically dump or tip the frame to the position indicated in dotted lines of Fig. 3 of the drawings, the shock being deposited on the ground, as indicated at Y, and the wire tie at Z. As the shock is being deposited on the ground the weight of the shock will press down the wire standards I upon the outer side of the frame, when said frame is brought to the position indicated in full lines of the left-hand side of Fig. 3 of the drawings. The position of the frame, as above described, is accomplished by hand and brought to a slight angle from a perpendicular. The pivoted flanged links E allow of this after adjustment of the frame, which is necessary to release the frame from contact with the shock, the frame being brought slightly inward as well as to an angle, so as to bring the frame free from contact with the shock. This tilting back of the shocking-frame brings the outer standards to the hanging position, as shown in Fig. 3 of the drawings, releasing the standards from contact with the shock and allowing the wagon to be driven forward until it passes the shock. Suitable flexible connections or chains *g* are connected to the shocking-frame and to the bed or frame of the wagon, so that the extent to which the frame is tilted in dumping or depositing the shock upon the ground may be regulated by shortening or lengthening the chains, as circumstances require.

I do not desire to limit myself to any special means for regulating the outward tilting of the shocking-frame, as any suitable means may be employed in place of the chains hereinbefore described. I further wish it understood that I do not limit myself to the means employed for holding the shocking-frame in a horizontal position and releasing the same when depositing the shock on the ground, as any suitable holding means may be employed.

In describing the general construction of my shocking attachment it should be generally understood that many changes and modifications may be resorted to without in any manner effecting the essential features of the invention, and any such changes as would come within ordinary mechanical means may be made without departing from the principle of the invention.

Having now fully described my invention, what I claim as new, and desire to secure by Letters Patent, is—

1. A shocking attachment to wagons, comprising a double-pivoted shocking-frame, means for holding the frame in a horizontal position, brackets having cam-bearings at the ends, and wire standards pivotally connected to the brackets, substantially as and for the purpose specified.

2. A shocking attachment to wagons, comprising two tilting shocking-frames, flanged links to which the frames are pivoted to form seats for the transverse bars of the shocking-frames, a plurality of wire-tie holders on each of the transverse bars and comprising curved springs and keepers, brackets connected to the shocking-frames and having cam-bearings at their ends, and wire standards pivotally connected to the brackets and acting in connection with the cams, substantially as and for the purpose set forth.

In testimony that I claim the above I have hereunto subscribed my name in the presence of two witnesses.

MARTIN BRUNER.

Witnesses:
P. J. WALSHE,
GEO. M. COPENHAVER.